Feb. 7, 1933.   R. S. TROTT   1,897,014
ENGINE MOUNTING
Original Filed May 27, 1929    2 Sheets-Sheet 1
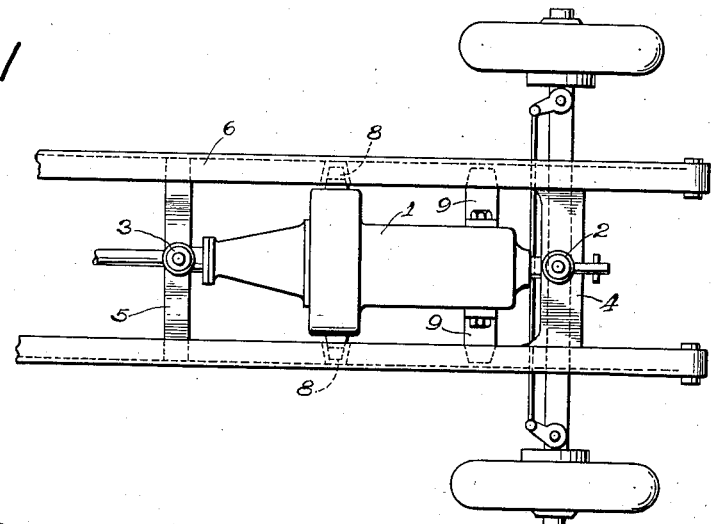
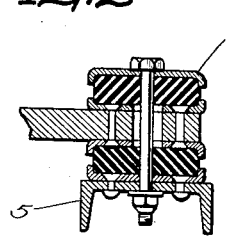 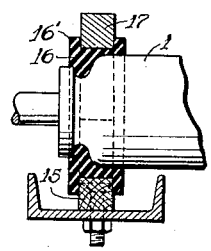 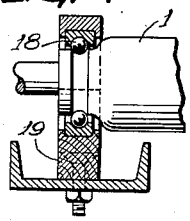
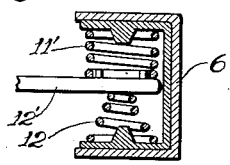
Inventor
Rolland S. Trott
Vernon E. Hodges  Attorney Feb. 7, 1933.  R. S. TROTT  1,897,014
ENGINE MOUNTING
Original Filed May 27, 1929    2 Sheets-Sheet 2
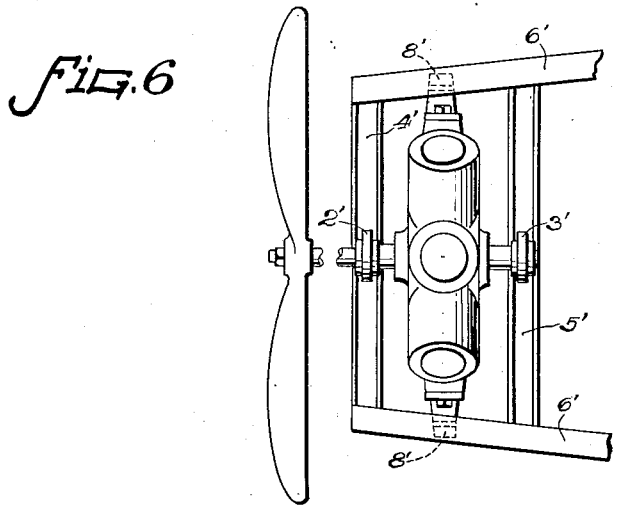
fig.6
fig.10
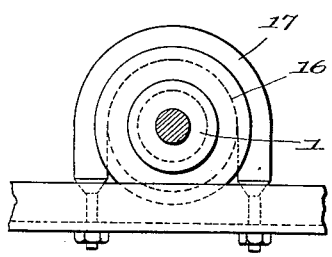
fig.7
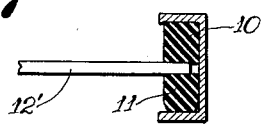
fig.8
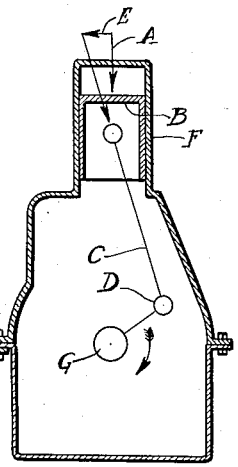
fig.9
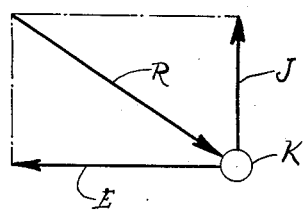
Inventor
Rolland S. Trott
Vernon E. Hodges Attorney Patented Feb. 7, 1933

1,897,014

UNITED STATES PATENT OFFICE

ROLLAND S. TROTT, OF DENVER, COLORADO

ENGINE MOUNTING

Original application filed May 27, 1929, Serial No. 366,406, now Patent No. 1,834,907, dated December 1, 1931. Divided and this application filed November 10, 1931. Serial No. 574,172.

This invention relates to engine mountings for engines having torque and force cushioning movements with respect to their supports and is a division of my application for a patent on engine mountings, filed May 27, 1929, Serial No. 366,406 now Patent No. 1,834,907 of Dec. 1, 1931.

The object of this invention is to provide an engine mounting which will securely hold the engine in place upon its support and which will nevertheless provide ample resilience in so far as the cushioning of the engine forces is concerned.

A further object is to provide a torque transmitting connection between the engine and its support, which will accommodate itself to the orbital action of the engine on its weight supporting cushion mountings, including the pivotal and the transverse cushioning movements which go to make up the floating orbital movement of the engine unit with respect to its support.

I accomplish this object by providing pivotal mounting means and cushioning means between the engine unit or power plant and its support, and adapted to carry substantially none of the torque reaction; and a second mounting means or torque connection composed of an arm and a resilient accommodating connection, between the engine unit and the support adapted to resiliently transmit the torque reaction to the support, but to carry substantially none of the weight and to accommodate itself to the pivotal and and transverse action of the floating power plant as it floats upon its mountings. All of this is fully described below and is illustrated in the drawings in which:—

Figure 1 is a diagrammatic view of a power plant unit and the support upon which it is mounted.

Figure 2 is a sectional view of one form of cushioned pivotal mounting.

Figure 3 is a sectional view of another form of cushioned pivotal mounting in which the outer and inner surfaces of the rubber member may act as bearing surfaces.

Figure 4 is a sectional view of another form in which an anti-friction bearing is used, the wood or non-metallic block acting as a cushion.

Figure 5 is a detail of another form of torque connection composed of a spring arm and an accommodating connection with the support.

Figure 6 is a diagrammatic view of a power plant unit of an air craft and its support.

Figure 7 is a detail of a torque connection using the spring arm shown in Figure 5 and the accommodating connection used in Figure 5.

Figure 8 is a diagrammatic view illustrating the forces acting upon the frame at the torque connection, and upon the engine.

Figure 9 is a diagram illustrating the resultant force upon the engine mountings.

Figure 10 is an end view of Figure 3.

Figure 1 shows the main essentials of the construction upon which my pivotal cushion mounting is to be employed. The power plant unit 1, is pivotally mounted as indicated at 2 and 3 upon the cross members 4 and 5 respectively of the support or frame 6. These mountings are adapted to carry the entire weight of the power plant unit and are to be strong enough and reliable enough so that the power plant unit will be securely attached to the support, but in such a manner as to permit cushioning and pivotal movements of the unit with respect to the support without the introduction of any question as to the security and safety of the mounting.

Figures 2, 3 and 4 are different forms of cushioned pivotal mountings which permit the power plant to float with respect to the frame.

It is evident that not only any of these mountings may be used at either front or rear or at both ends of the power plant, but any desired combination of any of the elements of any or all of these mountings may be employed, so long as substantially pivotal and transverse cushioning movements of the power plant are thereby provided.

In any case, however, the result in general will be the same, resulting in a floating movement of the engine unit with respect to its support which floating movement adapts itself in both direction and amount to the forces acting upon the mounting.

Two of these mountings are to be employed in the mounting of an engine unit. The result being that, due to the free pivotal movement, the torque reaction cannot be transmitted from the engine unit to the frame through the mountings and cushioning will be provided to cushion the transmission of resultant forces in a transverse plane through the mountings to the frame. The torque connections, between the power plant and the support or frame in a motor vehicle or in a marine craft unit with enclosed flywheel, may be conveniently mounted on the flywheel housing where the usual engine mounting arms are located, as indicated at 8 in Figure 1, or the connection may be made by the use of one or more braces 9, each properly attached to the power plant unit at any other point which may be used either in addition to or in place of those indicated at 8. Or but one torque connection between the power plant and its support may be used if it is properly proportioned to the work it must do.

Regardless of the number or location of the torque transmitting means between the engine unit and its support, it should be such as to provide a satisfactory and sufficiently resilient engagement between them.

In any case the construction and speed of action of the torque cushioning connection should be so proportioned to the engine torque and speed and any other pertinent factors as to put a torque reaction upon the support or frame, which is as nearly as possible constant in value.

In Figure 8 it will be seen that as the explosion force A forces the piston B downward in the cylinder F, the angularity of the connecting rod C journaled upon the crank D produces a side force E, tending to revolve the engine about its axis G. The frame I opposes the movement of the end of the resilient torque connection H by the force J.

In Figure 10 it will be seen that the forces J and E combined place a resultant force R upon the engine mounting K. It will be evident that as the torque and speed of the engine vary, the forces E and J combined with the resistance to rotation offered by the inertia of the engine parts will cause the force R to vary not only in intensity, but also in direction. Since this force R varies as stated and is not continuous, the final result is, that due to the cushion pivotal mountings employed, the axis G of the engine will travel in an orbit, which will vary according to conditions and in ordinary driving of a motor vehicle will seldom remain the same for more than a brief period.

For these reasons it is necessary that the torque connection to the frame be such as to accommodate itself not only to the pivotal but also to the orbital movements provided by the mountings.

The action of the torque connection at its engagement with the frame must therefore be not only transverse, that is, toward or away from the axis G, but also oscillatory. In the construction shown in Figure 7, due to the flexing of the spring 12' itself, the oscillatory movement of the spring 12' with respect to the rubber engagement with the frame will be greater than would be caused by the orbital movement alone of the engine on its mountings.

The constructions shown in Figure 5 and in Figure 7 by the use of the spring 12' permit the necessary amount of the resiliently opposed pivotal float of the engine on its mountings and the springs 11' and 12 in the one construction, and the rubber blocks 10 and 11 in the other construction, form sound deadening connection with the frame, which accommodate for both the transverse and oscillatory movements of the engine unit on its mounting.

The word "stabilizer" or equivalent term is used in the claims to designate a yielding connection between the engine unit and a part of the vehicle other than the engine unit to oppose or limit oscillation of the engine unit due to the forces incident to the operation of the engine unit.

The reference in the claims to the spring means and its associated yieldable means being arranged in series is intended to cover such an arrangement thereof whereby torque or torque reaction or any force tending to resist the torque cushioning oscillation of the engine goes through one of these means and then the other in passing between the engine unit and the frame, or vice versa.

Having now described my invention what I claim as new and desire to protect by Letters Patent is as follows:

1. In a motor vehicle, an engine unit mounted for oscillation about a longitudinal axis, and means for limiting the oscillation of said engine unit, comprising a spring member secured to the engine unit, and yieldable means interposed between the free end of the spring member and a part of the vehicle other than the engine unit.

2. Stabilizing means for use on an engine mounted for oscillation about a longitudinal axis, comprising a spring member secured to the engine unit, and yieldable means interposed between the free end of the spring member and a part of the vehicle other than the engine unit.

3. Stabilizing means for use on an engine unit mounted in a vehicle for oscillation about a longitudinal axis, comprising a torque reaction transmitting spring member and associated yieldable means arranged in series and connecting the engine unit with a part of the vehicle other than the engine unit.

4. Stabilizing means for use on an engine unit mounted for oscillation about a longitudinal axis, comprising a spring member extending at an angle to said axis, and yieldable means associated with the spring member, said spring member and yieldable means being interposed between the engine unit and a part of the vehicle other than the engine unit.

5. In a vehicle, stabilizing means for use on an engine unit mounted for oscillation about a longitudinal axis, comprising a spring member attached to the engine unit, and yieldable means connected with said spring member and engaging a part of the vehicle, said spring member and yieldable means extending from the engine unit to a part of the vehicle other than the engine unit.

6. A stabilizer construction for an engine unit mounted upon a vehicle for oscillation about a longitudinal axis, comprising at least two resilient means having different vibration periods associated together in series and forming a connection between the engine unit and a part of the vehicle other than the engine unit.

7. A stabilizer construction for an engine unit mounted on a vehicle for oscillation about a longitudinal axis, comprising metallic spring means and associated sound deadening means arranged in series and forming a connection between the engine unit and a part of the vehicle other than the engine unit, and adapted to limit such oscillation in both directions.

8. A stabilizer construction for an engine unit mounted on a vehicle for oscillation about a longitudinal axis, comprising leaf spring means, and means combined in series with the spring means to form a connection between the engine unit and a part of the vehicle other than the engine unit.

9. A stabilizer construction for an engine unit mounted on a vehicle for oscillation about a longitudinal axis, comprising leaf spring means, and means combined in series with the spring means and adapted to cooperate with the spring means to form a connection between the engine unit and a part of the vehicle other than the engine unit and to limit said oscillation of the engine unit in both directions.

10. Stabilizing means for an engine unit mounted in a vehicle for oscillation about a longitudinal axis, comprising a leaf spring connected between the engine unit and a part of the vehicle and constructed and arranged for freely opposing the torque induced oscillation of the engine unit about said axis.

In testimony whereof I have hereunto subscribed my name at Rockford, Winnebago County, Illinois.

ROLLAND S. TROTT.